United States Patent [19]

Nishikawa et al.

[11] Patent Number: 4,716,780

[45] Date of Patent: Jan. 5, 1988

[54] TELESCOPIC STEERING MECHANISM FOR AUTOMOTIVE VEHICLE

[75] Inventors: Masumi Nishikawa, Toyoake; Masanobu Ishikawa, Nagoya; Yuji Yokoya; Sumio Takizawa, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 914,993

[22] Filed: Oct. 3, 1986

[30] Foreign Application Priority Data

Oct. 4, 1985 [JP] Japan .................. 60-222421

[51] Int. Cl.$^4$ ............................................ B62D 1/18
[52] U.S. Cl. ........................... 74/493; 74/89.15; 280/775; 384/10
[58] Field of Search ............... 74/89.15, 493; 280/775; 384/10

[56] References Cited

U.S. PATENT DOCUMENTS

| 3,216,521 | 11/1965 | Ulrich | 280/775 X |
| 4,602,520 | 7/1986 | Nishikawa et al. | 74/493 |
| 4,633,732 | 1/1987 | Nishikawa et al. | 280/775 X |

FOREIGN PATENT DOCUMENTS

| 70221 | 1/1983 | European Pat. Off. | 384/10 |
| 58-33570 | 2/1983 | Japan | 74/493 |
| 58-191668 | 11/1983 | Japan | 74/493 |
| 60-4464 | 1/1985 | Japan . | |
| 60-188614 | 9/1985 | Japan . | |
| 591641 | 9/1977 | Switzerland | 384/10 |

Primary Examiner—Allan D. Herrmann
Attorney, Agent, or Firm—Oblon, Fisher, Spivak, McClelland, & Maier

[57] ABSTRACT

A telescopic steering mechanism for automotive vehicles includes first and second support members telescopically coupled with each other for relative movement, a first shaft rotatably carried by the first support member, a second shaft rotatably carried by the second support member and telescopically coupled with the first shaft for rotation therewith, a feed screw shaft arranged in parallel with the first and second shafts and rotatably carried by the first support shaft, and a feed nut fixedly mounted on the second support member and threadedly coupled over the feed screw shaft for effecting relative movement of the support members in accordance with rotation of the feed screw shaft. In the above arrangement: the first support member is integrally formed thereon with an elongated guide lug which is arranged in parallel with the first and second shafts; the second support member is integrally formed thereon with a support portion which is axially movably coupled over the elongated guide lug and resiliently engaged with the elongated guide lug, and the feed screw shaft is assembled to be slightly displaceable in a radial direction on the first support member.

4 Claims, 6 Drawing Figures

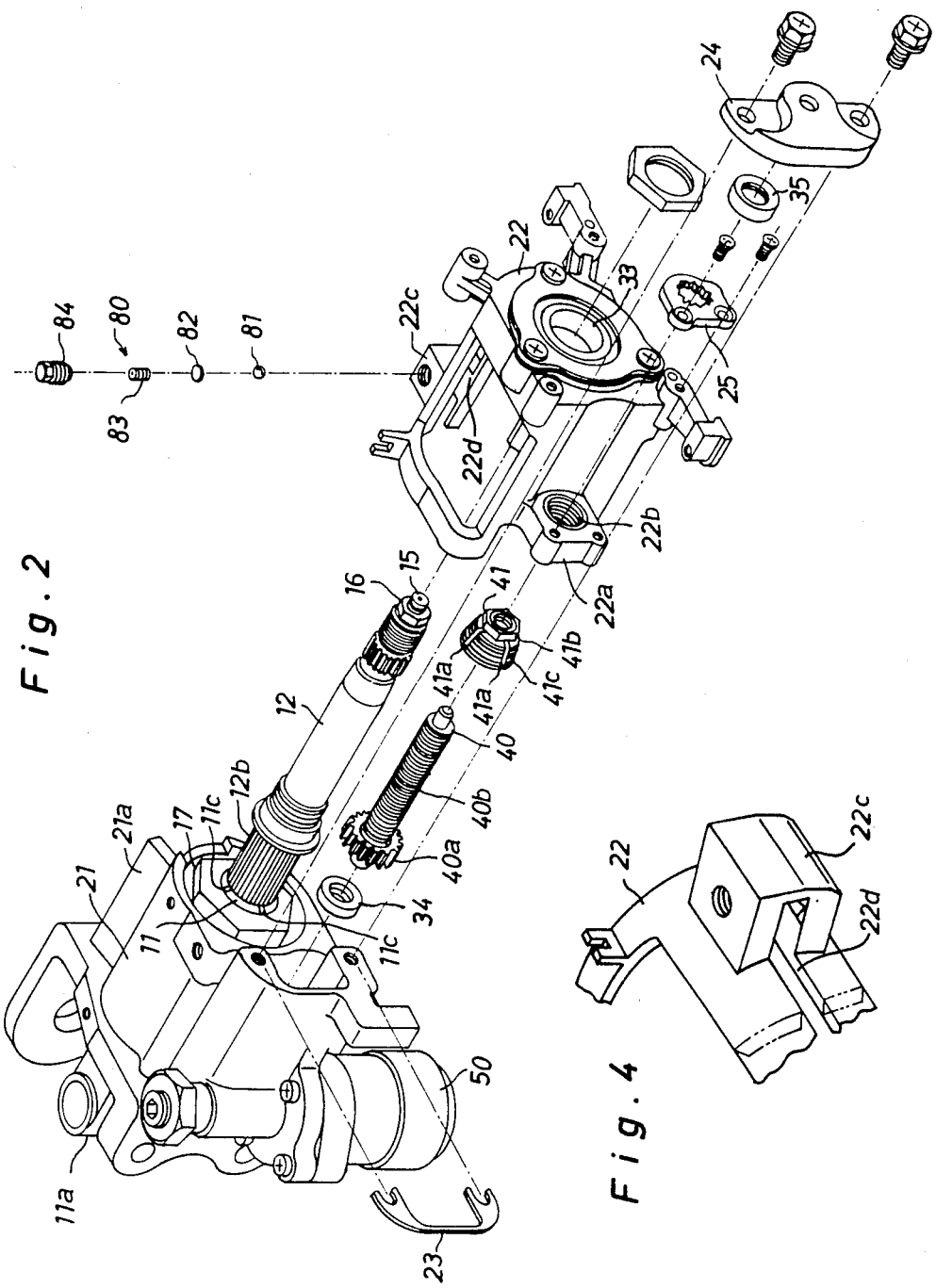

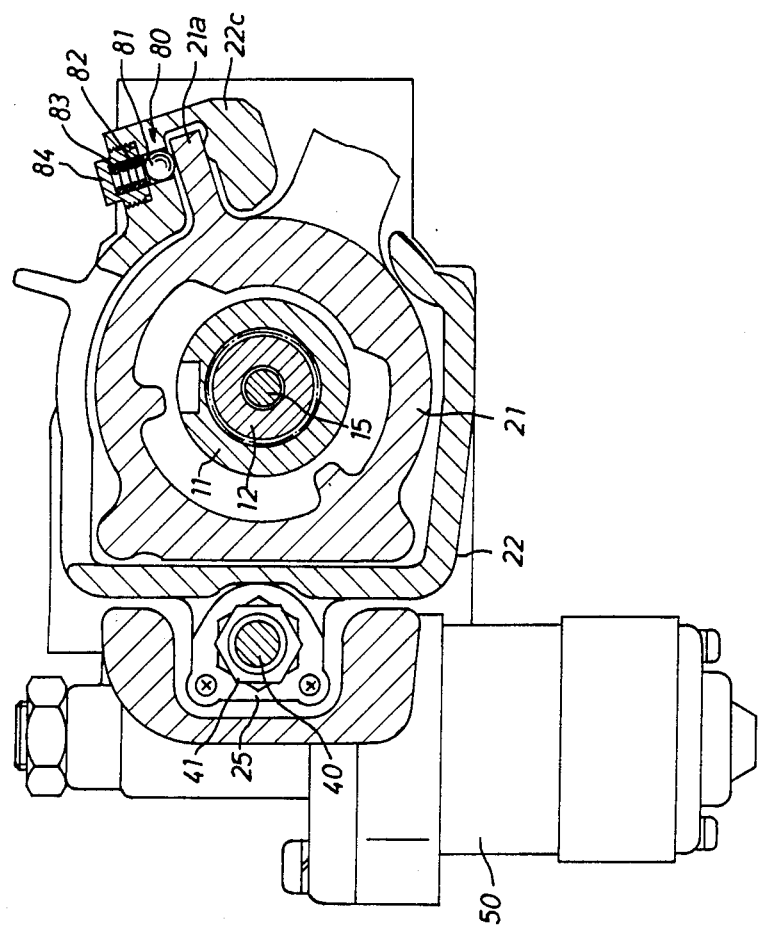

TELESCOPIC STEERING MECHANISM FOR AUTOMOTIVE VEHICLE

BACKGROUND OF THE INVENTION

1. Field of the Invention

The present invention relates to a steering mechanism for automotive vehicles, and more particularly to a telescopic steering mechanism of the type which includes first and second support members telescopically coupled with each other for relative movement, a first shaft rotatably carried by the first support member, a second shaft rotatably carried by the second support member and telescopically coupled with the first shaft for rotation therewith, a feed screw shaft arranged in parallel with the first and second shafts and rotatably carried by the first support member, and a feed nut fixedly mounted on the second support member and threadedly coupled over the feed screw shaft for effecting relative movement of the first and second support members in accordance with rotation of the feed screw shaft.

2. Description of the Prior Art

In Japanese Patent Early Publication No. 60-4464, there has been proposed such a telescopic steering mechanism as described above wherein the first support member is mounted on a vehicle body structure, and the second shaft is provided thereon with a steering wheel. In the telescopic steering mechanism, it is required to connect the first and second shafts to each other without causing any undesired gap therebetween in order to prevent vibration of the steering wheel and enhance a feel in steering operation. It is further required to eliminate undesired gap between the feed screw shaft and nut in order to retain the steering wheel in place. In Japanese Patent Early Publication No. 60-188614, there has been proposed a mechanism which is arranged to satisfy the requirements. However, undesired vibration of the support members may not be eliminated due to relative movement thereof. Furthermore, if there is an error in machining of the feed screw shaft and nut, undesired movement or vibration of the support members will occur during rotation of the feed screw shaft. This causes undesired vibration of operation levers mounted on the second support member.

SUMMARY OF THE INVENTION

In view of the foregoing problems, it is an object of the present invention to provide an improved telescopic steering mechanism capable of eliminating undesired movement or vibration of the operation levers mounted on the support member possibly in a simple manner.

According to the present invention, the object is attained by providing a telescopic steering mechanism wherein one of the support members is integrally formed thereon with an elongated guide lug which is arranged in parallel with the first and second support members, and the other support member is integrally formed thereon with a support portion which is axially movably coupled over the elongated guide lug and resiliently engaged with the elongated guide lug, and wherein the feed screw shaft is assembled to be slightly displaceable in a radial direction on the first support member.

BRIEF DESCRIPTION OF THE DRAWINGS

Additional objects and advantages of the present invention will become more readily apparent from the following detailed description of a preferred embodiment thereof when considered with reference to the accompanying drawings, in which:

FIG. 2 is an exploded perspective view of the telescopic steering mechanism shown in FIG. 1;

FIG. 3 is a cross-sectional view taken along line III—III in FIG. 1;

FIG. 4 is a perspective view illustrating a support boss of a second support member shown in FIG. 2;

DESCRIPTION OF THE PREFERRED EMBODIMENTS

Figure 1:
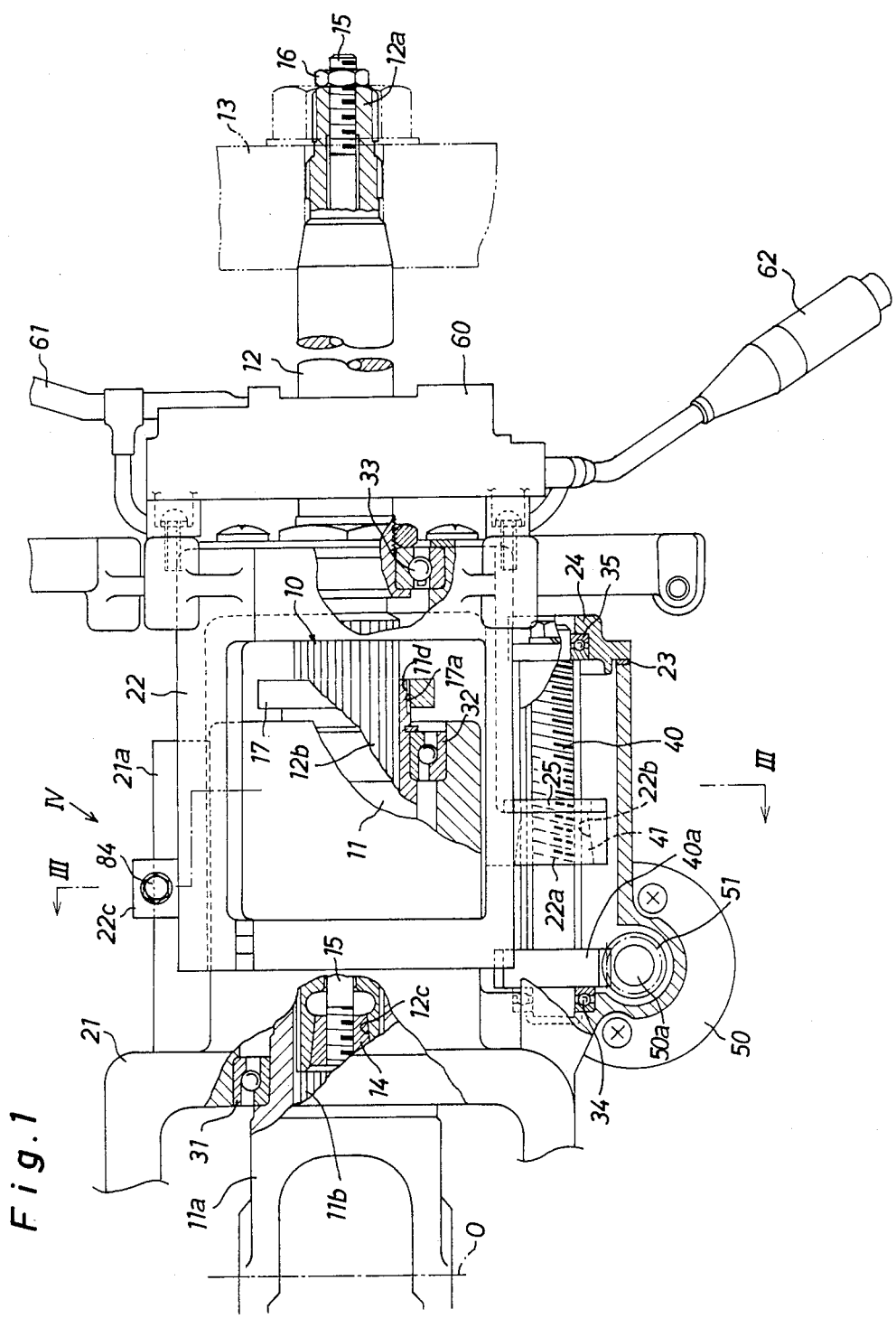
FIG. 1 is a partly broken plan view of a telescopic steering mechanism in accordance with the present invention.

Referring now to the drawings, particularly in FIGS. 1 and 2, there is illustrated a telescopic steering mechanism which includes a first support member 21 to be mounted on a vehicle body structure through a conventional tiltable mechanism (not shown), a second support member 22 telescopically coupled with the first support member 21 for relative movement thereto, and a steering shaft assembly 10 rotatably carried on the first and second support members 21, 22. The steering shaft assembly 10 includes a first shaft 11 which is rotatably supported by a pair of axially spaced radial bearings 31 and 32 carried on the first support member 21 and is fixed in place in an axial direction. The steering shaft assembly 10 further includes a second shaft 12 which is rotatably supported at an intermediate portion thereof by a radial bearing 33 carried on the second support member 22 and is fixed in place in an axial direction with respect to the second support member 22.

The first member 11 has a york 11a connected to a steering main shaft (not shown) by means of a universal joint to be tiltable about an axis 0 and has an internally splined bore 11b. The second shaft 12 has a right end portion 12a supporting thereon a steering wheel 13 and has an externally splined portion 12b which is telescopically coupled within the internally splined bore 11b of first shaft 11 for rotation therewith. The externally splined portion 12b of second shaft 12 is formed with a plurality of circumferentially equi-spaced axial slits (not shown) to be radially outwardly expanded and is formed in its left end with a tapered bore 12c in which a cone member 14 is disposed. The cone member 14 is connected to one end of an internal shaft 15 which extends through an axial bore of second shaft 12 outwardly. The outer end of internal shaft 15 is threadedly engaged with the right end 12a of second shaft 12 and fastened in place by a lock nut 16 threaded thereon. When the internal shaft 15 is rotated to move outwardly, the cone member 14 is moved rightwards to expand the externally splined portion 12b of second shaft 12. This eliminates undesired gap between the externally splined portion 12b of second shaft 12 and the internally splined bore 11b of first shaft 11.

As shown in FIG. 2, the right end of first shaft 11 is formed with a plurality of circumferentially equi-spaced axial slits 11c and is compressed radially inwardly by a fastening nut 17 threaded thereon to eliminate undesired gap between the externally splined portion 12b of second shaft 12 and the internally splined bore 11b of first shaft 11. The right end of first shaft 11 is formed with tapered male screw threads 11d, while the fastening nut 17 is formed with tapered female screw threads 17a which are coupled over the tapered male screw threads 11d to fasten the right end of first shaft 11 radially inwardly.

Assembled on one side of the first support member 21 are a feed screw shaft 40 for effecting axial movement of the second support member 22 and an electric motor 50 for rotating the feed screw shaft 40. The feed screw shaft 40 is integrally formed at its left end portion with a worm-wheel 40a and at its intermediate portion with feed screw threads 40b. The screw shaft 40 is arranged in parallel with the steering shaft assembly 10 and is rotatably supported at its left end by means of a thrust bearing 34 and at its right end by means of a thrust bearing 35. The thrust bearing 34 is carried on the first support member 21 in such a manner as to restrain axial displacement of the screw shaft 40 and to permit slight radial displacement of the screw shaft 40. The thrust bearing 35 is coupled within a cover plate 24 which is secured to an end face of first support member 21 through a shim plate 23 by means of a pair of bolts. The thrust bearing 35 is carried on the cover plate 24 in such a manner as to restrain axial displacement of the screw shaft 40 and to permit slight radial displacement of the screw shaft 40. The electric motor 50 is in the form of a reversible motor to be driven under control of an appropriate operation switch (not shown). A rotary shaft 50a of motor 50 is formed with a worm 51 in meshing engagement with the worm-wheel 40a of screw shaft 40.

Assembled on the second support member 22 are a feed nut 41 and a holder 60 supporting thereon operation levers 61 and 62. As shown in FIG. 2, the feed nut 41 is formed with a plurality of circumferentially equispaced axial slits 41a and a hexagonal head 41b. The feed nut 41 is fixedly coupled with an arm 22a of second support member 22 by engagement with tapered female screw threads 22b of arm 22a at its tapered male screw threads 41c. A retainer plate 25 is secured to the arm 22a of second support member 22 by means of a pair of bolts to retain the feed nut 41 in place by engagement with the hexagonal head 41b of nut 41. Thus, the feed nut 41 is threadedly coupled over the feed screw shaft 40 to be axially moved by rotation of the screw shaft 10.

In this embodiment, the first support member 21 is integrally formed at another side thereof with an elongated guide lug 21a which is arranged in parallel with the steering shaft assembly 10, while the second support member 22 is integrally formed with a support boss 22c which is axially movably coupled over the elongated guide lug 21a. As shown in FIGS. 3 and 4, the second support member 22 is formed at its side wall with an axial slot 22d which is located to contain therein the elongated guide lug 21a of first support member 21. The support boss 22c of second support member 22 is provided therein with a spring loaded ball assembly 80 which is engaged with one face of elongated guide lug 21a to resiliently engage the opposite face of elongated guide lug 21a with an internal wall of support boss 22c. The spring loaded ball assembly 80 includes a ball 81 contained in a stepped bore of support boss 22c, a plate 82 in contact with the ball 81, a compression spring 83 received by the plate 82, and a fastening plug 84 threaded into the stepped bore of support boss 22c to compress the spring 83 by engagement therewith.

In the telescopic steering mechanism described above, the electric motor 50 is driven under control of the operation switch to rotate the screw shaft 40 in one direction. This causes the second support member 22 to move leftward relatively to the first support member 21. Thus, the second shaft 12 is forced into the first shaft 11 to shorten the steering shaft assembly 10. When the electric motor 50 is driven under control of the operation switch to rotate the screw shaft 40 in a reverse direction, the second support member 22 is moved rightward relatively to the first support member 21 to pull out the second shaft 12 from the first shaft 11. Thus, the steering shaft assembly 10 is extended in an appropriate length for the driver.

During adjustment of the steering shaft assembly 10, the elongated guide lug 21a of first support member 21 is resiliently engaged with the support boss 22c of second support member 22 under the load of compression spring 83, while the support boss 22c of second support member 22 is slidably guided by the elongated guide lug 21a of first support member 21. This is effective to resiliently restrict circumferential movement of the second support member 22 relative to the first support member 21. If relative movement between the feed screw shaft 40 and nut 41 in a radial direction is caused by an error in machining of the screw threads 40b, the thrust bearings 34 and 35 will permit slight movement of the feed screw shaft 40 in the radial direction. This is effective to absorb undesired movement of the second support member 22 and to eliminate undesired movement of the operation levers 61 and 62.

Figure 6:
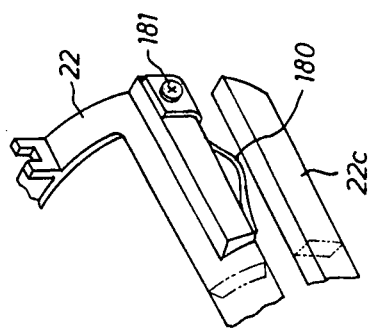
FIG. 6 is a perspective view illustrating a portion of FIG. 5.
Figure 5:
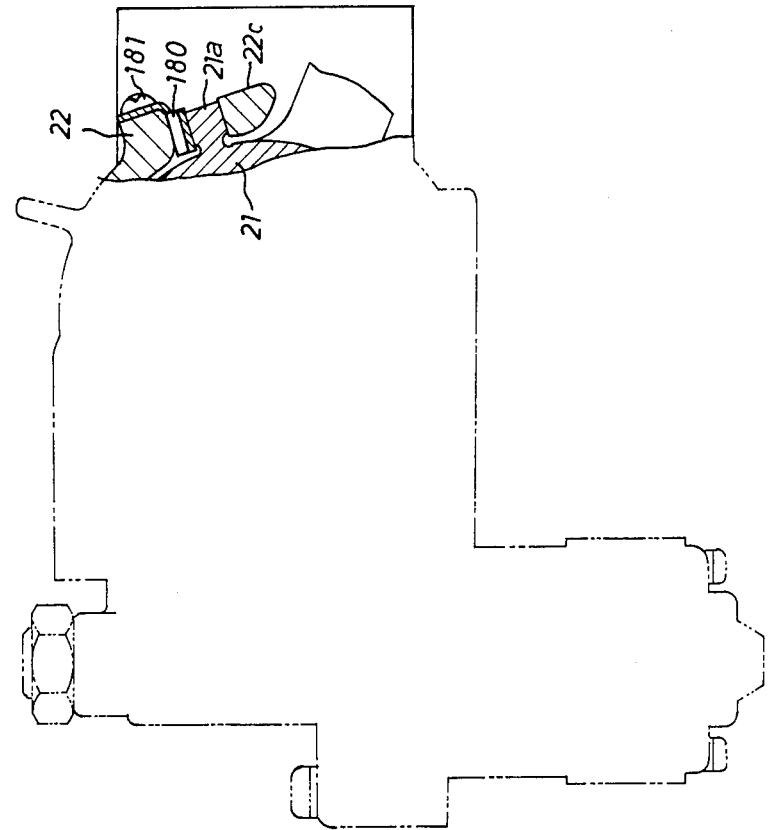
FIG. 5 illustrates a modification of the steering mechanism.

In FIGS. 5 and 6 there is illustrated a modification of the telescopic steering mechanism, wherein the spring loaded ball assembly 80 is replaced with a leaf spring 180 secured at its one end to the second support member 22 by means of a screw 181. In this modification, the leaf spring 180 is engaged with one face of the elongated guide lug 21a of first support member 21 to resiliently engage the opposite face of guide lug 21a with the second support member 22.

Although in the foregoing specification a preferred embodiment and a modification of the concept underlying the present invention have been described in detail, various other embodiments as well as certain other variations and modifications of the embodiment will obviously occur to those skilled in the art upon becoming familiar with said underlying concept. It is to be understood, therefore, that within the scope of the appended claims, the invention may be practiced otherwise than as specifically set forth herein.

What is claimed is:

1. A telescopic steering mechanism for automotive vehicles including first and second support members telescopically coupled with each other for relative movement, a first shaft rotatably carried by said first support member, a second shaft rotatably carried by said second support member and telescopically coupled with said first shaft for rotation therewith, a feed screw shaft arranged in parallel with said first and second shafts and rotatably carried by said first support shaft, and a feed nut fixedly mounted on said second support member and threadedly coupled over said feed screw shaft for effecting relative movement of said first and second support members in accordance with rotation of said feed screw shaft, wherein one of said support members is integrally formed thereon with an elongated guide lug which is arranged in parallel with said first and second shafts, and the other support member is integrally formed thereon with a support portion which is axially movably coupled over said elongated guide lug, one of said support members being provided with means for resiliently engaging said elongated guide lug with said support portion of the other support member, and wherein said feed screw shaft is assembled to be slightly displaceable in a radial direction on said first support member.

2. A telescopic steering mechanism as claimed in claim 1, wherein said elongated guide lug is integrally formed on said first support member, and said support portion is integrally formed on said second support member, and wherein said resilient means is provided on said second support member.

3. A telescopic steering mechanism as claimed in claim 2, wherein said resilient means includes a spring loaded ball assembled within said support portion of said second support member and being engaged with one face of said elongated guide lug to resiliently engage the opposite face of said guide lug with said support portion.

4. A telescopic steering mechanism as claimed in claim 2, wherein said resilient means includes a leaf spring secured at one end thereof to said support portion of said second support member and being engaged with one face of said elongated guide lug to resiliently engage the opposite face of said guide lug with said support portion.

* * * * *